W. D. CHASE.
Machines for Cutting and Threading Pipes, &c.
No. 143,273. Patented September 30, 1873.
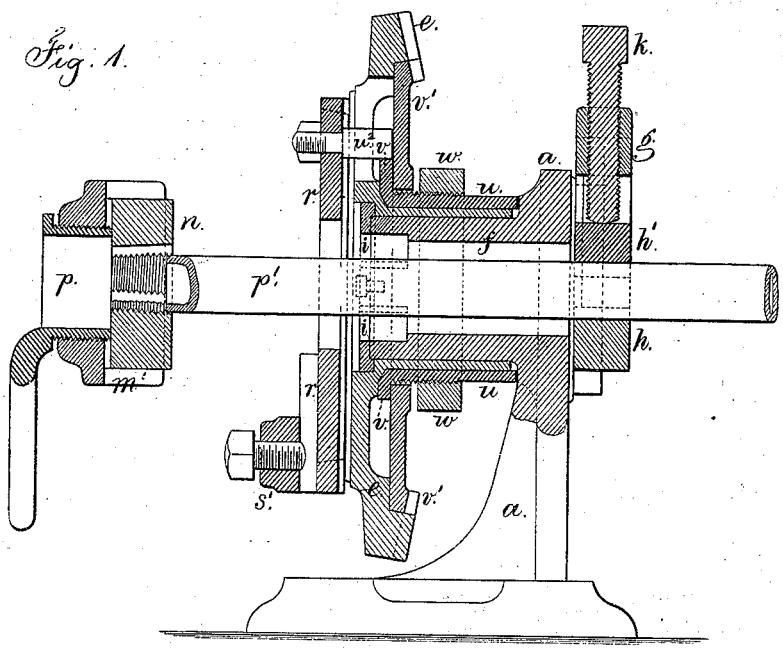
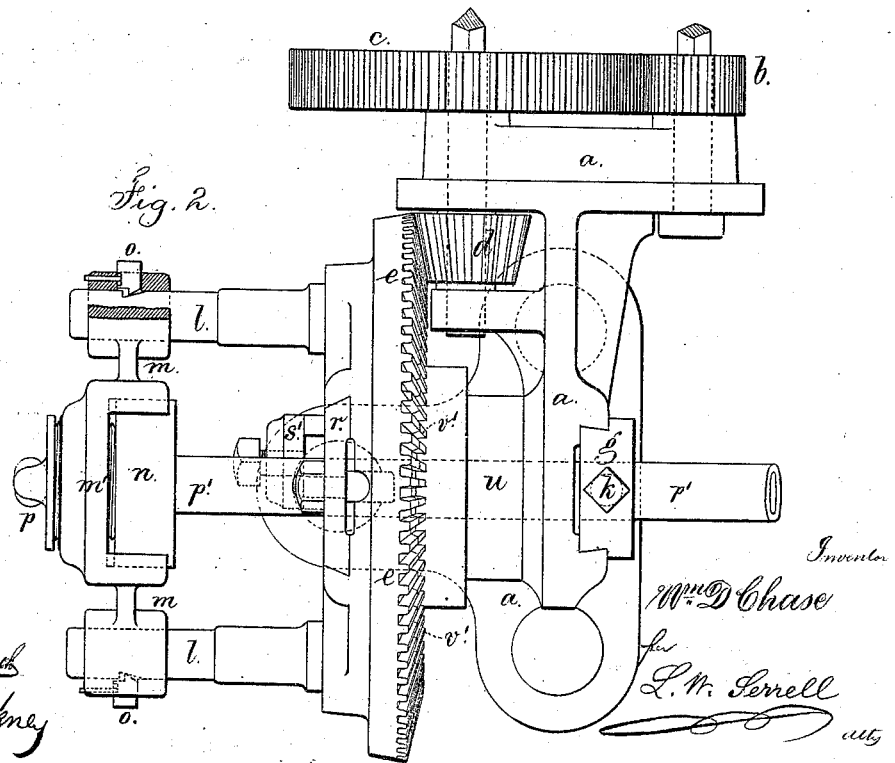

2 Sheets--Sheet 2.

W. D. CHASE.
Machines for Cutting and Threading Pipes, &c.

No. 143,273. Patented September 30, 1873.

Witnesses
Chas. H. Smith
Geo. T. Pinckney

Inventor
Wm. D. Chase
per L. W. Serrell
atty

AM. PHOTO-LITHOGRAPHIC CO. N.Y. (OSBORNE'S PROCESS)

UNITED STATES PATENT OFFICE.

WILLIAM D. CHASE, OF MARION, NEW JERSEY.

IMPROVEMENT IN MACHINES FOR CUTTING AND THREADING PIPES, &c.

Specification forming part of Letters Patent No. 143,273, dated September 30, 1873; application filed June 3, 1873.

*To all whom it may concern:*

Be it known that I, WILLIAM D. CHASE, of Marion, county of Hudson and State of New Jersey, have invented an Improvement in Machinery for Cutting and Threading Pipes, of which the following is a specification:

This invention is a modification of and improvement upon Letters Patent granted to me April 27, 1869; and consists, first, in a means for moving the cutting-tool gradually up to its work as the tool is revolved around the pipe or bar to be cut off; second, in mechanism for holding the screw-die and revolving the same around the pipe to cut the screw thereon.

Figure 3:
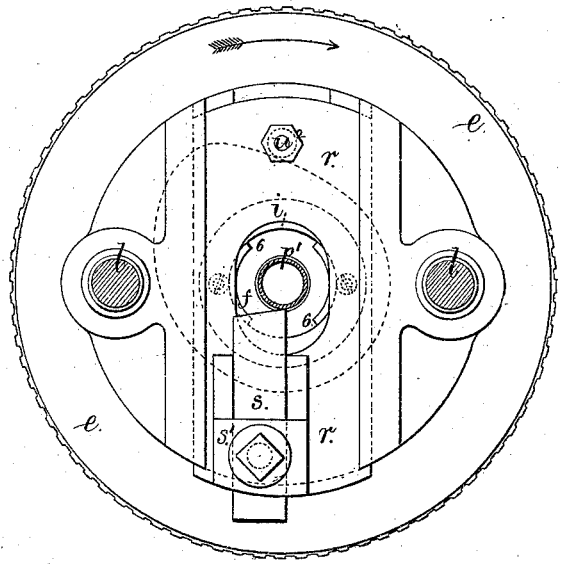

In the drawing, Figure 1 is a vertical section of the machine complete. Fig. 2 is a plan of the same with part of the die-carrier in section. Fig. 3 is an elevation of the face-plate and cutter; and Fig. 4 is a longitudinal section, showing some of the parts transposed in position for cutting short pieces of pipe.

The frame or standard $a$ supports the shaft and pinion $b$, that is revolved by a crank applied to the squared end of the shaft or otherwise. This pinion $b$ gears into the wheel $c$, the shaft of which has a bevel-pinion, $d$, that communicates a revolving motion to the face-plate $e$, carrying the cutting mechanism and the die. This face-plate is upon a sleeve that surrounds a hollow gudgeon, $f$, projecting from the frame $a$, and through which gudgeon the pipe or rod to be cut or threaded passes; and the ring $i$ is attached upon the end of this hollow gudgeon $f$, and retains the face-plate $e$, but allows it to revolve. Upon the frame $a$, at the end of the opening through the gudgeon $f$, there are dove-tail slides, in which the stock $g$ slides, and this stock is provided with the stationary griper $h$ and adjustable griper $h'$, that is clamped upon the pipe by the screw $k$; and a set-screw may be employed to hold the stock at the proper place within the V-slides, so as to position the pipe centrally of the apparatus. The face-plate $e$ is provided with the two columns $l$ $l$, upon which the cross-head $m$ slides; and this cross-head is made with a central die-box, $m^1$, to receive the screw-die $n$; and at the ends of the cross-head are latch-pins $o$ $o$, entering notches in the columns $l$, and preventing the cross head moving away from the face-plate, but allowing it to move up toward said face-plate as the die screws upon the pipe in cutting the thread thereupon. These latch-pins $o$ $o$ serve to hold the cross-head against pressure applied by the handle and screw-ring $p$ to the die $n$ to force it upon the pipe sufficiently to make the thread of the die seize and cut the pipe; and by making the thread of this screw-ring $p$ left-handed, the handle will only require to be held stationary in order to make the screw-ring screw inwardly against the back of the die and press it upon the pipe as the die, cross-head, and face-plate are revolved around the pipe $p'$ to be threaded. When the die is not employed and the pipe or rod is to be cut off, the slide $r$, fitting in grooves or dovetails transversely upon the face-plate $e$, is employed, and said slide $r$ carries a cutting-tool, $s$, in a clamping-jaw, $s'$.

It will now be evident that when the face-plate is revolved it will be necessary to move the slide $r$ transversely to feed the tool $s$ gradually inwardly as the cutting progresses. This is effected by the means next described. Around the sleeve of the face-plate is a second sleeve, $u$, with a screw-thread near the cam-flange $v$, and a bevel-gear, $v'$, within the gear $e$ is next to this flange $v$, and is confined thereto by the screw-ring $w$, or released therefrom by unscrewing said ring $w$. When the cutting-tool $s$ is not to be used the ring $w$ is to be loose, and the sleeve $u$ and cam-flange $v$ are free to revolve with the face-plate and the other parts, and said tool might be held out of the way by a clamping-screw passing through the slide $r$; but when the ring $w$ is screwed up and the wheel $v'$ clamped to the flange $v$, then the sleeve $u$, flange $v$, and ring-nut $w$ are turned as the face-plate is revolved, but not at the same speed, in consequence of the wheel $v'$ having one or two teeth more or less than the number of teeth in the wheel $c$; hence the position of the wheel and the cam-flange changes in the revolution of the parts relatively to the face-plate and slide $r$, and the cam-flange $v$ is made to act upon the stud or roller $u^2$, that projects from the back of the slide $r$, and thereby the cutting-tool is pressed toward the pipe by the motion of the slide, and, when the pipe has been cut off, the parts can either be turned backward to bring the cutter $s$ clear of the pipe $p'$, and ready for a second operation, or else the revolution can be continued, allowing the cam-flange to complete a revolution to bring the cutter to place again. If the stud $u^2$ is made with an enlarged screw next to the head it may be passed through the slide $r$ from the outside, and can be easily removed or screwed firmly to place.

Figure 4:
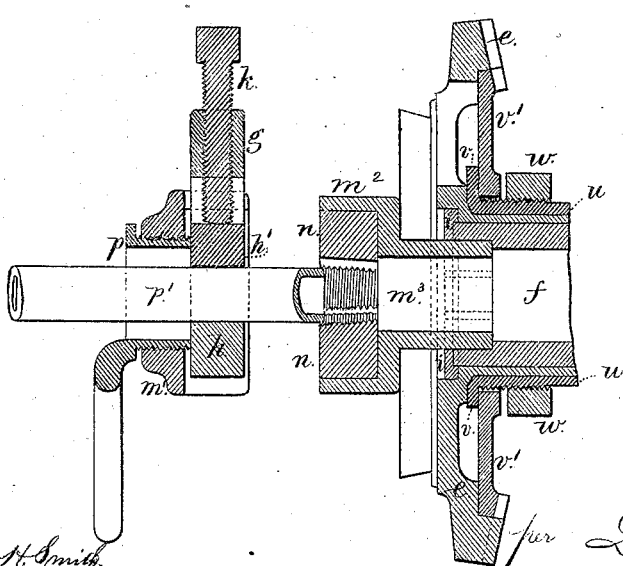

In order to cut a thread upon a short piece of pipe, the parts are transposed, as shown in the section, Fig. 4. The slide $g$ and griping-jaws $h\ h'$ are placed in the die-box $m'$ of the cross-head $m$, so as to seize and revolve the short piece of pipe, and the die $n$ is held stationary within a die-box, $m^2$, that has a tubular projection, $m^3$, that enters within the hollow gudgeon $f$, and is prevented from turning by interlocking projections corresponding with those shown at 6, Fig. 3. In this manner the shortest lengths of pipe can be threaded; but the first-described arrangement of the parts is preferable with long pieces of pipe.

I claim as my invention—

1. The cam-flange $v$, sleeve $u$, clamping-nut $w$, and wheel $v'$, in combination with the face-plate $e$ and cutting-tool $s$, substantially as and for the purposes set forth.

2. The latch-pins $o\ o$ and notched columns $l\ l$, in combination with the screw-ring $p$, die-box $m'$, and die $n$, substantially as and for the purposes set forth.

3. The movable die-box $m^2$, with a tubular projection, $m^3$, entering the hollow gudgeon $f$, in combination with the gripers $h\ h'$, cross-head $m$, columns $l$, and revolving face-plate $e$, substantially as set forth.

Signed by me this 28th day of May, 1873.

W. D. CHASE.

Witnesses:
  GEO. T. PINCKNEY,
  CHAS. H. SMITH.